United States Patent [19]
Scharfen

[11] 3,790,181
[45] Feb. 5, 1974

[54] SWIVEL CHUCK FOR MACHINING WORKPIECES WITH A PLURALITY OF AXES CROSSING EACH OTHER

[75] Inventor: Hans Scharfen, Buderich, Germany

[73] Assignee: Paul Forkardt Kommanditgesellschaft, Dusseldorf, Germany

[22] Filed: June 6, 1972

[21] Appl. No.: 260,108

[30] Foreign Application Priority Data
June 9, 1971 Germany.................. P 21 28 618.0

[52] U.S. Cl. .................................... 279/4, 279/5
[51] Int. Cl. ..................... B23b 31/30, B23b 31/34
[58] Field of Search .................................... 279/4, 5

[56] References Cited
UNITED STATES PATENTS
3,682,492  8/1972  Scharfen et al. ........................ 279/5
2,643,132  6/1953  Hunziker et al. .................. 279/4 X Primary Examiner—Francis S. Husar
Attorney, Agent, or Firm—Walter Becker

[57] ABSTRACT

A chucking device in which a chuck body has aligned opposed jaws reciprocable toward and away from each other on a common axis and rotatable on the axis. Respective actuators are provided for the jaws to effect the reciprocation of the jaws on the axis. One jaw locks to the chuck body in an outermost position while the actuator therefor develops a greater thrust than the actuator for the other jaw.

12 Claims, 2 Drawing Figures

SWIVEL CHUCK FOR MACHINING WORKPIECES WITH A PLURALITY OF AXES CROSSING EACH OTHER

The present invention relates to a swivel chuck for machining work pieces at a plurality of axes crossing each other, for instance for machining the housings of armatures, the chuck being provided with a clamping mechanism and a pivoting or swivel mechanism each of which is equipped with a rotatable clamping jaw which clamping jaws are arranged opposite to each other and in alignment with each other. The clamping jaw of the clamping mechanism is for clamping and unclamping purposes axially displaceable, and the clamping jaw of the pivoting mechanism is with chucked-in work piece rotatable by means of a pivotable shaft and is adapted to be locked in certain positions.

With a heretofore known swivel chuck of the above described type, the pivoting mechanism comprises a plurality of hydraulic cylinders which are offset with regard to each other by a portion of the pivoting angle. The pistons pertaining to the hydraulic pressure cylinders are provided with pushrods and are adapted successively to act upon a multi-cornered body provided on the pivotable shaft. The pressure cylinders will in this way bring about not only a pivoting of the rotatable clamping jaws and of the chucked work piece, but will simultaneously bring about a locking thereof.

Although the heretofore known swivel chucks have proved very satisfactory for work pieces with smaller dimensions, they are not very suitable for machining large work pieces with dimensions exceeding 1000 mm. If with a swivel chuck for machining such large work pieces the individual elements thereof were enlarged to a corresponding degree, such chuck would be unfeasibly large. On the other hand, in a chuck body which would be sufficiently strong to withstand the required tensioning and supporting forces, a pivoting mechanism of the described design could be provided only with such small dimensions that the diameter of the pivoting shaft, the radius of the multi-cornered body and the forces of the pushrods acting thereon would not suffice to lock the work piece, which is supported by the clamping jaw on the pivotable shaft in such a rigid manner, especially so rotation-resistant, to the chuck body as it is necessary for a vibration-free machining at its outer end. The cutting forces occurring during a machining of work pieces with large dimensions will, due to the long lever arm, yield such high torsion moments that the pushrods acting directly upon the pivotable shaft will, even when enlarging the engaging surface, not be in the position (due to the short lever arm) to prevent an elastic deformation of the system comprising clamping jaw and work piece.

It is, therefore, an object of the present invention to provide a swivel or pivotable chuck of the above described type for machining work pieces at a plurality of intercrossing axes which will assure a safe and vibration-free locking of the clamping jaws and which can also be employed for machining large work pieces.

This object and other objects and advantages of the invention will appear more clearly from the following specification in connection with the accompanying drawing diagrammatically showing an embodiment of a swivel or pivotable chuck according to the invention, the chuck being shown in longitudinal section.

The chuck according to the invention is characterized primarily in that the clamping jaw of the pivoting mechanism is adapted positively to be locked directly to the body of the pivoting mechanism and together with the pivotable shaft is axially displaceably journalled in such a way that by an axial displacement of both clamping jaws and by overcoming the pressing force of the clamping mechanism the clamping jaw of the clamping mechanism can be unlocked.

According to a further feature of the invention, the positive connection is effected by two spur gear systems, one of which is arranged on the clamping jaw and the other one of which is arranged on the body of the pivoting mechanism.

The pivotable chuck according to the invention will, in view of the positive interengagement of the clamping jaw and of the body of the clamping mechanism assure a safe and vibration-free locking which also when machining work pieces of large dimensions will prevent inaccuracies in the machining. Inasmuch as the locking is effected by the same hydraulic pressure which also produces the pressing force of the clamping piston of the clamping mechanism, it will be assured that the locking engagement cannot be undone during the working operation. Due to the employment of spur gears in conformity with the present invention for bringing about a positive interengagement, there will be obtained the advantage that the pivoting movement can be finely subdivided in conformity with the number of teeth of the spur gears which are preferably designed as Hirth-serrations. In this connection it is furthermore possible to select the number of teeth of the gear systems in conformity with the pitch angles of the work piece and also during continuous operations to maintain the various working positions with high precision.

In order to be able to adapt the pivoting movements or locking positions to the respective work piece to be machined, it is suggested according to a further feature of the invention in addition to the clamping jaws also to make the spur gear teeth on the pivotable body exchangeable.

According to a still further development of the swivel chuck according to the invention, the pivotable shaft is adapted to be driven by a continuous drive, for instance by a hydraulic motor, through the intervention of a worm gear drive. According to a special embodiment of the invention, the gear of the transmission is adapted axially to slide directly on the pivotable shaft in a non-rotatable manner but is slidable in axial direction in order to be able to carry out the required axial movement necessary for a disengagement.

Finally, it is suggested according to the invention to fasten a hydraulic piston on the pivotable shaft. The displacement force of this hydraulic piston exceeds that exerted upon the clamping jaw of the clamping mechanism, preferably by a hydraulic clamping piston. In this connection, different forces may be realized by differently high pressures or by making the piston surface of the hydraulic piston on the pivotable shaft larger than that of the hydraulic clamping piston so that the same pressure source can be employed for chucking the work piece and for unlocking the positive connection.

Further objects and advantages of the present invention will become apparent in the drawings and description.

Figure 1:
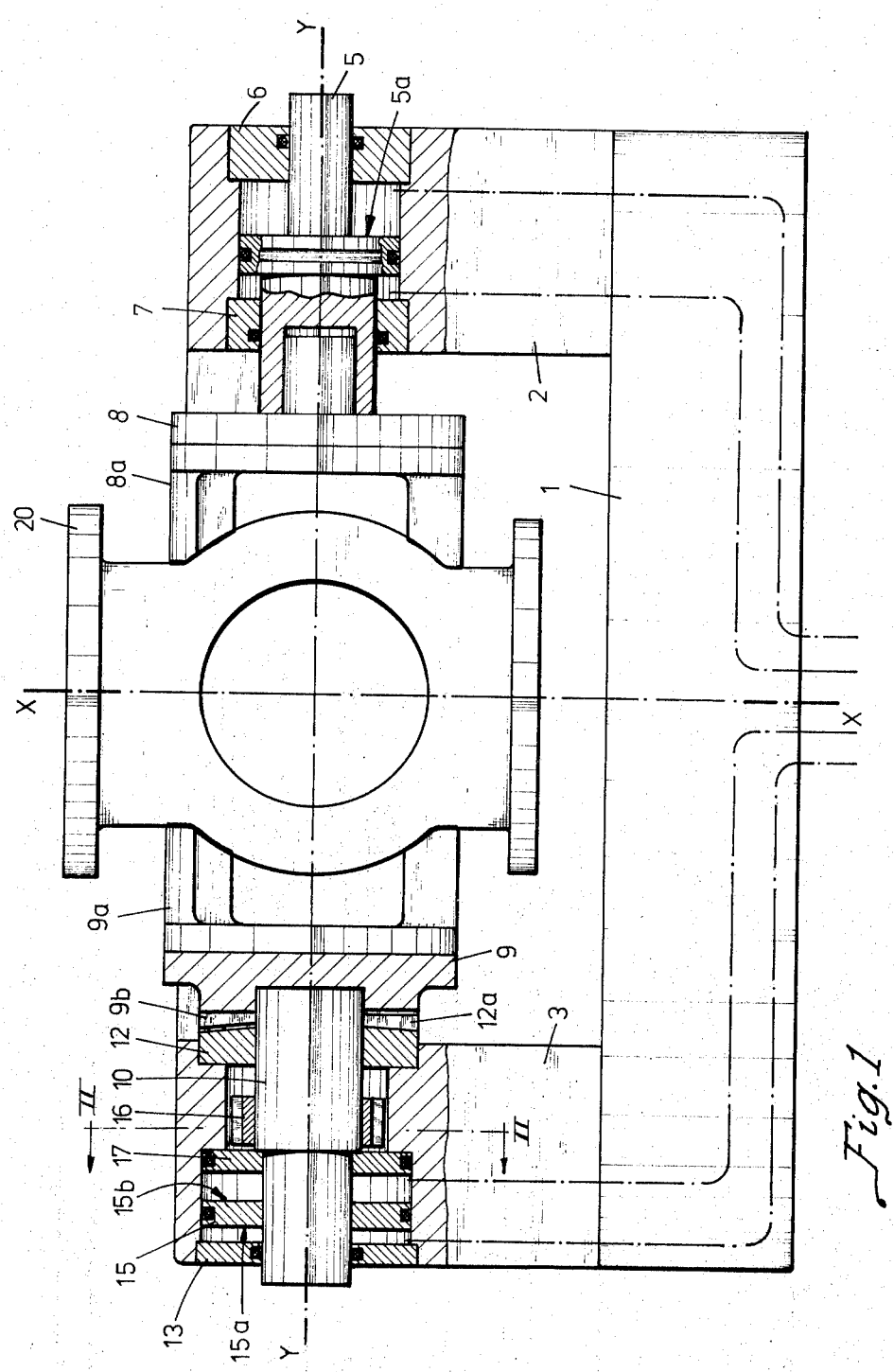
FIG. 1 is a partially sectioned elevational view of a chuck having features in accordance with the present invention.

Referring now to the drawing in detail, the pivotable or swivel chuck as illustrated in the drawing comprises a chuck body 1 which is welded together from different parts and has a pot-shaped contour while being connected to the spindle of a non-illustrated turning machine. The axis of rotation of the chuck body 1 is designated X—X. Connected to the chuck body 1 are, opposite to each other, a chucking mechanism 2 and a pivoting mechanism 3.

A clamping piston 5 is axially displaceably guided in the housing of the clamping mechanism 2. The housing of the clamping mechanism is closed by two covers 6 and 7 through which the clamping piston 5 is passed in a sealing manner. Rotatably connected to the inner end of the clamping piston 5 is a clamping jaw 8 which, in its turn, serves for receiving a jaw 8a. This jaw 8a is formed and designed in conformity with the respective work piece to be machined and is accordingly exchangeably connected to the clamping jaw 8. The work piece specifically shown by way of example in the drawing represents a valve housing.

The second clamping jaw 9 for chucking the work piece 20 is connected to a pivotable shaft 10 which is axially displaceable and is rotatably journalled in the housing of the pivoting mechanism by means of two bearing brackets 12 and 13.

In order to obtain an axial displacement of the pivotal shaft 10 which

Figure 2:
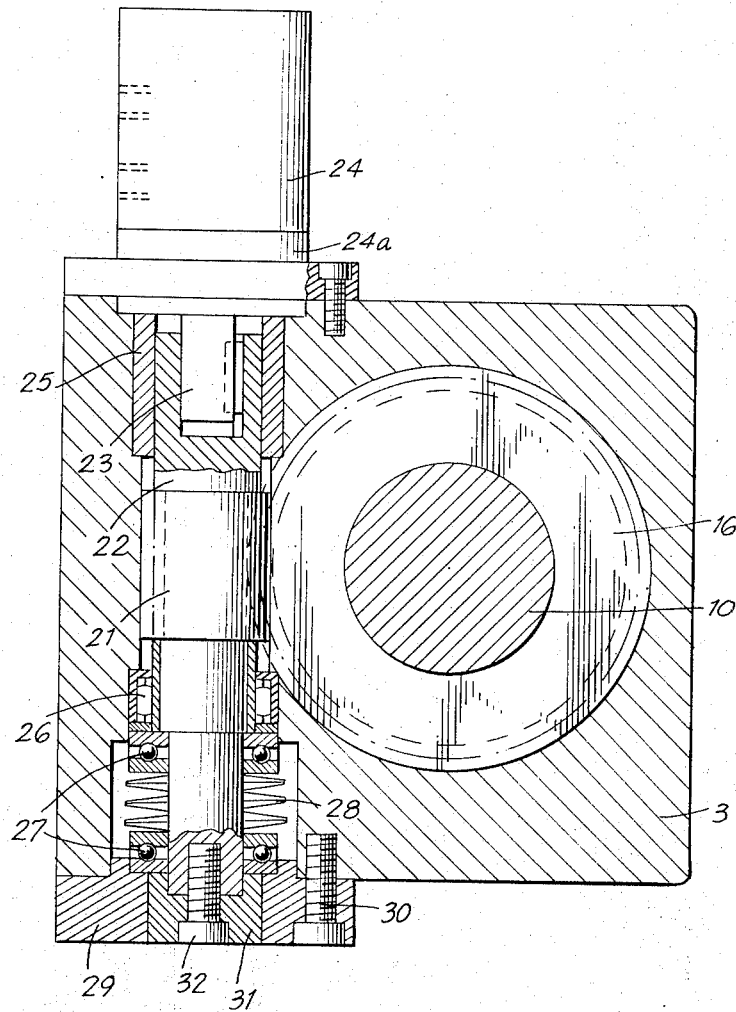
FIG. 2 is a cross sectional view taken along the line II — II in FIG. 1.

In the clamping jaw 9, a hydraulic piston 15 is connected to said shaft 10. The rotary movement of shaft 10 is, according to the specific embodiment shown, imparted upon shaft 10 by means of a gear 16 which is driven by a drive, for instance, a hydraulic motor through the intervention of a transmission. The gear 16 is keyed to shaft 10. With the above mentioned particular design with a gear directly mounted on the pivotable shaft, said gear is, by means of bearings rings, prevented from an axial displacement in the housing of the pivoting mechanism. Gear 16 is connected to shaft 10 by axial gearing so that these two parts are positively connected to each other in the direction of rotation whereas an axial displacement of shaft 10 relative to gear 16 is possible when piston 15 is acted upon correspondingly. In FIG. 2 there is recognizable in the right part thereof of the housing of the pivoting mechanism 3 in which the gear 16 is located as secured upon the pivot shaft 10. This gear 16 operates together with a worm pinion or bevel gear 21 which is secured upon a worm shaft 22. This worm shaft 22 has a bore to permit shifting thereof onto the drive stump or stub 23 of a drive 24a which is driven from a hydraulic motor 24. In order to make possible an axial movement of the worm shaft 22, the same can be moved to and fro upon the drive stump or stub 23. The worm shaft 22 is journaled at the upper end thereof in a slide bearing 25 and at the lower end thereof in a needle bearing 26 in a radial direction. Additionally, there occurs a journaling of the worm shaft 22 by way of two axle bearing means 27 at the lower end, between which the disc spring package 28 is arranged. The axle bearing means 27 are supported upon a cover 29 which is secured by means of screws 30 on the housing of the pivoting mechanism 3. In the middle of the cover 29 there is a stopper 31 which is secured by means of a screw 32 on the worm shaft 22.

The inventive rotational drive consists of the hydraulic motor 24 and a drive 24a flanged thereon. The gear 16 is journaled directly upon the pivot shaft 10 and is connected rotationally fixed therewith.

In order to hinder impermissibly high tensions in the described rotational drive which could occur with a displaced meshing of the end face teeth or gear means 9b and 12a, there must be axial shifting capability either for the gear 16 upon the pivot shaft 10 or the worm pinion 21 must be axially shiftable with the worm shaft 22. With the illustrated embodiment the entire worm shaft 22 is axially shiftable as recognizable clearly in FIG. 2.

Between gear 16 and piston 15 in the housing of the pivoting mechanism there is fastened in a pressure-tight manner an intermediate cover 17 through which shaft 10 is passed in a sealed manner. In this way, the piston 15 separates two cylinder chambers from each other which can be vented or placed under pressure independently of each other.

In order to be able to lock the work piece to be machined in its respective position with a high repeat precision and in a torsion-resistant and vibration-free manner on the chuck body 1, the clamping jaw 9 of the pivoting mechanism 3 is, on that side of jaw 9 which faces the housing of the pivoting mechanism, provided with spur teeth 9b. These teeth 9b cooperate with spur teeth 12a provided on the bearing bracket 12 of the housing of the pivoting mechanism. In the particular example shown of the pivotable chuck, both spur gear systems 9a and 12a are designed as Hirth-type serrations which, due to their fine pitch, permit a locking in a great number of positions. For purposes of locking, the shaft 10 with the clamping jaw 9 is by subjecting the piston surface 15b to pressure, moved into the illustrated position. As a result thereof, the spur teeth 9b are firmly pressed into the spur teeth 12a and a precise locating as well as a stiff support for the jaw 9 in all directions will be assured.

Prior to chucking a work piece 20, the clamping jaw 9 is held in the thus described and illustrated position but the clamping jaw 8 is retracted. Work piece 20 will then be placed upon the contour jaw 9a, and the clamping piston 15 has its piston surface 5a acted upon by a pressure fluid so that the clamping jaw 8 moves toward the work piece 20 and holds the same positively and frictionally. The machining of the work piece can be effected in the chucked position.

When the work piece, for instance, an armature housing is to be machined at an axis which crosses with the present axis, a pivoting of the work piece about the pivot axis Y—Y is necessary. To this end the positive interlock between the clamping jaw 9 and the bearing block 12 has to be released. The previously loaded inner surface 15b of the piston 15 is relieved from the pressure fluid and instead the outer piston surface 15a is acted upon by pressure fluid. Since, with the illustrated example, the piston surface 15a of the hydraulic piston 15 is greater than the piston surface 5a of the clamping piston 5, it will be appreciated that when maintaining the chucking force acting upon the work piece, the two clamping jaws 8 and 9 will, together with the chucked work piece 20, be displaced in the direction toward the clamping mechanism 2 so that the two spur gear systems 9a and 12a will disengage each other.

According to the specific embodiment referred to above, shaft 10 slides within the gear 16.

By means of the drive, the gear 16 is turned about a desired angle while the work piece 20 is moved into the desired second maching position. If now, the pressure acting upon the piston surface 15a of the hydraulic piston 15 is relieved, and the piston surface 15b is again subjected to pressure, the clamping jaw 9 moves back to the illustrated position. In this connection, the chucking piston 5 which remains further under pressure brings about that also the clamping jaw 8 together with the workpiece is moved back again. By means of the teeth 9a and 12a simultaneously a locking of the clamping jaw 9 in its new working position will occur. This locking is conveyed through the work piece also upon the clamping jaw 8 of the chucking mechanism 2 so that the chucked work piece can now be machined further.

In view of the fine pitch of the spur teeth 9a and 12a, it is not only possible to machine the work pieces at axes crossing each other with large angles, for instance with axes crossing each other at 90° or even 180°, but also crossing angles of a lower even number of degrees are possible in conformity with the finest of the spur teeth. By means of the above mentioned pivotable or swivel chuck, it is possible to machine, for instance, also the seating surfaces of which slides or valves in one chucking position with the feeding in and discharge openings of the housing of the wedge slide or valve, said seating surfaces forming with the wedge slide axis an angle of from 4 to 6°.

As will be evident from the above, the described type of locking and unlocking for the clamping jaw 9 not only excels in simplicity precision and great stiffness, but also assures in a simple manner that the clamping force used for chucking the work piece, for instance, between roughing and smoothing, can be reduced at random and independently thereof can safely remain unchanged during the pivoting operation.

It is, of course, to be understood that the present invention is, by no means, limited to the particular showing in the drawing, but also comprises any modifications within the scope of the appended claims.

What is claimed is:

1. In a chuck for chucking workpieces, especially workpieces which are to be machined on different axes; a chuck body, first and second jaws in said body in aligned opposed relation on a chucking axis and supported for rotation on said axis, respective actuators in said body connected to said jaws for moving the jaws toward and away from each other between outermost and innermost end portions on said axis, and cooperating elements of interengageable locking means on said first jaw and said body interengageable in the outermost end position of said first jaw to lock said first jaw against rotation on said body, said elements being disengageable in response to movement of said first jaw inwardly from the said outermost end position thereof.

2. A chuck according to claim 1 in which said cooperating elements of locking means comprise tooth means fixed to said body and facing said first jaw and tooth means on said first jaw facing the said tooth means on said body.

3. A chuck according to claim 1 which includes a shaft rotatable and reciprocable in said body and connected at one end to said first jaw and at the other end to the respective said actuator, and means for driving said shaft in rotation including a gear mounted thereon.

4. A chuck according to claim 3 in which said gear is replaceably mounted on said shaft.

5. A chuck according to claim 3 which includes a rotary drive adapted for connection to said gear.

6. A chuck according to claim 5 in which said rotary drive includes a fluid motor and a transmission driven thereby, said transmission including a gear meshing with the gear on said shaft.

7. A chuck according to claim 4 in which said gear is slidable on said shaft but nonrotatable on the shaft.

8. A chuck according to claim 1 in which said actuators comprise a piston for each jaw and a cylinder formed in said body for each piston, a shaft for each jaw having one end connected to the respective jaw and the other end connected to the respective piston, and means for reversibly supplying fluid under pressure to said pistons.

9. A chuck according to claim 1 in which the actuator for said first jaw develops a greater thrust than the actuator for said second jaw, energization of only the actuator for said second jaw being operable for clamping a workpiece between said jaws, and energization of said actuator for said first jaw being operable to move said first jaw inwardly from locked position thereof even if the actuator for said second jaw is energized at the same time.

10. A chuck according to claim 9 in which each said actuator comprises a double acting piston connected to the respective jaw, and the piston for said first jaw having a larger effective area than the piston for said second jaw.

11. A chuck according to claim 1 in which said elements of locking means comprise two annular rows of teeth on the said chucking axis and one of said rows on said body and the other of said rows on said first jaw.

12. A chuck according to claim 11 in which said teeth are in the form of fine teeth extending radially to said axis.

* * * * *